US006944860B2

(12) United States Patent
Schmidt

(10) Patent No.: US 6,944,860 B2
(45) Date of Patent: Sep. 13, 2005

(54) METHOD AND APPARATUS FOR REPRESENTING AND ENCAPSULATING ACTIVE COMPUTING ENVIRONMENTS

(75) Inventor: Brian Keith Schmidt, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 658 days.

(21) Appl. No.: 09/764,771

(22) Filed: Jan. 16, 2001

(65) Prior Publication Data

US 2002/0133529 A1 Sep. 19, 2002

(51) Int. Cl.[7] .............................. G06F 9/44; G06F 9/46
(52) U.S. Cl. ...................................... 718/100; 717/100
(58) Field of Search .............................. 718/100, 102, 718/105; 709/201, 203; 717/100–101

(56) References Cited

U.S. PATENT DOCUMENTS

| | | | |
|---|---|---|---|
| 6,477,698 B1 * | 11/2002 | Shalish ........................ 716/18 |
| 6,496,871 B1 * | 12/2002 | Jagannathan et al. ....... 719/317 |
| 6,698,017 B1 * | 2/2004 | Adamovits et al. ......... 717/168 |
| 6,792,466 B1 * | 9/2004 | Saulpaugh et al. ......... 709/229 |
| 6,795,966 B1 * | 9/2004 | Lim et al. ..................... 718/1 |

OTHER PUBLICATIONS

"Technical White Paper", VMware, Inc. Feb. 1999.*
Schrimpf, Harald. "Migration of Processes, Files, and Virtual Devices in the MDX Operating System", ACM SIGOPS vol. 29, Issue 2 (Apr. 1995).*

* cited by examiner

Primary Examiner—Majid Banankhah
Assistant Examiner—Syed J Ali
(74) Attorney, Agent, or Firm—Martine Penilla & Gencarella, LLP

(57) ABSTRACT

The present invention provides a representation and encapsulation of active computing environments. In accordance with one or more embodiments of the present invention a "compute capsule" is implemented. Each compute capsule serves to represent and encapsulate an active computing environment. An active computing environment comprises one or more active processes and their associated state information. The associated state information is information in a form that can be understood by any computer and tells the computer exactly what the processes in the capsule are doing at any given time. In this way, the compute capsule is a host-independent encapsulation that can be suspended on one computer, moved to a new computer, and re-started on the new computer where the new computer is binary compatible.

1 Claim, 16 Drawing Sheets

METHOD AND APPARATUS FOR REPRESENTING AND ENCAPSULATING ACTIVE COMPUTING ENVIRONMENTS

BACKGROUND OF THE INVENTION

1. Field of the Invention

The present invention relates to the representation and encapsulation of active computing environments.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

In modern computing it is desirable for a user to be interacting with a computer, to stop the interaction with the computer, to move to a new computer, and to begin interacting with the new computer at precisely the point where the user stopped interacting with the first computer. Using current schemes, however, this is not possible because the user's computing environment cannot be represented in a form that can be understood by both computers and moved between the computers. Before further discussing the drawbacks of current schemes, it is instructive to discuss how the nature of computing is changing.

The Nature of Computing

The nature of computing is changing. Until recently, modern computing was mostly "machine-centric", where a user accessed a dedicated computer at a single location. The dedicated computer had all the data and computer programs necessary for the user to operate the computer, and ideally, it had large amounts of hardware, such as disk drives, memory, processors, and the like. With the advent of computer networks, however, different computers have become more desirable and the focus of computing has become "service-oriented". In particular, computer networks allow a user to access data and computer programs that exist elsewhere in the network. When the user accesses such data or computer programs, the remote computer is said to be providing a service to the user. With the improvement in services available to users, the need to have a dedicated computer following the machine-centric paradigm is greatly reduced. The machine-centric paradigm also becomes much less practical in this environment because distributing services is much more cost-effective.

In particular, computers in a service-oriented environment have little need for powerful hardware. For instance, the remote computer processes the instructions before providing the service, so a powerful processor is not needed on the local access hardware. Similarly, since the service is providing the data, there is little need to have large capacity disk drives on the local access hardware. In such an environment, one advantage is that computer systems have been implemented that allow a user to access any computer in the system and still use the computer in the same manner (i.e., have access to the same data and computer programs).

For instance, a user may be in location A and running a word processor, a web browser, and an interactive multimedia simulation. In a service-oriented environment, the user might stop using the computer in location A and move to location B where the user could resume these computer programs on a different machine at the exact point where the user stopped using the machine at location A, as long as both computers had access via the computer network to the servers where the programs were being executed. The programs in this example, however, cannot be moved between computers when they are active because of the design of current operating systems.

Current Operating Systems

It would be beneficial to move the active processes in the above example for various reasons. One reason occurs if the servers crashed or were shut down for maintenance or upgrades. In this situation, if the active processes cannot be moved, the user has no access to the processes while the server is off-line. Also, the processes and their state will be lost, possibly resulting in loss of critical data or effort.

Another reason to move the processes might be if one of the servers became very busy. In this scenario, it might allow the user a better computing experience if the active processes were dynamically load balanced. For instance, if the resources on a server became scarce (the processor and memory, for instance) one of the processes could be moved to a less busy machine and resumed there where there is more processor capacity and memory available.

Sometimes it is useful to suspend active processes in a persistent storage so that they release scarce system resources. For instance if the server running the word processor, web browser, and multimedia simulation is overloaded it would be beneficial to have the ability to suspend the non-critical processes and store them in a non-volatile storage medium, such as a disk, so that later they can be retrieved and restarted on the same or a different computer system. Consider also the scenario where there are many clients who have initiated long-running jobs on the server. When those users disconnect, their sessions become idle, but the sessions remain on the server, which reduces the number of sessions that can reside on the server. By storing these idle sessions on disk scalability is improved (i.e., the server can host more active sessions).

In addition, it would be beneficial to migrate a group of active computer programs (i.e., a session) to be closer to a user. For instance, if a user working in Los Angeles traveled to New York, it is beneficial to migrate that session to a server closer to New York for improved response time.

Using current operating systems, however, the critical state of an active computation is inaccessible, which makes it impossible to stop the active processes and transport them to new machines. The critical state is located in the kernel. The kernel acts as a mediator between the user's computer programs and the computer hardware. The kernel, among other things, performs memory management for all of the running processes and makes sure that they all get a share of the processor. The critical state of a process is dispersed among various kernel data structures, and there is no facility for extracting it, storing it off-line, or re-creating it from an intermediate representation. For example, the complete state of a Unix pipe cannot be precisely determined by user-level routines. The identities of the endpoints and any in-flight data are known only by the kernel, and there is no mechanism to duplicate a pipe only from its description.

Thus, there is no mechanism for encapsulating active computations such that they can be separated from the kernel. As such, each active process is locked to a specific machine, which binds its existence to the transient lifetime of the underlying operating system.

SUMMARY OF THE INVENTION

The present invention provides a method and apparatus which represents and encapsulates active computing environments. According to one or more embodiments of the present invention a "compute capsule" is implemented. Each compute capsule serves to represent and encapsulate an active computing environment. An active computing environment comprises one or more active processes and the complete state necessary to allow the encapsulation to be suspended and revived on any binary compatible machine.

The state information is information in a host-independent form that tells a computer exactly what each of the processes are doing at any given time. This may include privileges, configuration settings, working directories and files, assigned resources, open devices, installed software, and internal program state.

To encapsulate the state necessary to move a group of processes between machines one embodiment virtualizes the application interface to the operating system and repartitions state ownership so that all host-dependent information is moved out of the kernel and into the compute capsules. In one embodiment, the repartitioning comprises moving one or more members of the CPU state, the file system state, the device state, the virtual memory state, and the inter-process communication (IPC) state into the capsule.

In one embodiment, capsules are created using a capsule_create system call. In another embodiment, a process may join a capsule by invoking a capsule_join system call. A compute capsule is entirely self-contained and can be suspended in secondary storage, arbitrarily bound to different machines and different operating systems, and transparently resumed.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention relates to the representation and encapsulation of active computing environments. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Compute Capsules

A compute capsule comprises one or more processes and their associated system environment. A compute capsule is configured to provide an encapsulated form that is capable of being moved between computers or stored off-line, for instance on a disk drive or other non-volatile storage medium. The system environment in a capsule comprises state information relating to exactly what the processes are doing at any given time in a form that is understandable by any binary compatible machine. System environment information may include, for instance, privileges, configuration settings, working directories and files, assigned resources, open devices, installed software, and internal program state.

Processes in the same capsule may communicate with each other and share data via standard IPC mechanisms, for instance using pipes, shared memory, or signals. Communication with processes outside the capsule, on the other hand, is restricted to Internet sockets and globally shared files. This ensures that capsules can move without restriction. For example, a pipe between processes in different capsules would force both capsules to reside on the same machine, but a socket can be redirected. The use of compute capsules is completely transparent, and applications need not take any special measures, such as source code modification, re-compilation, or linking with special libraries. In addition, a system using compute capsules can seamlessly inter-operate with systems that do not.

Re-Partitioning the Operating System

Figure 1:
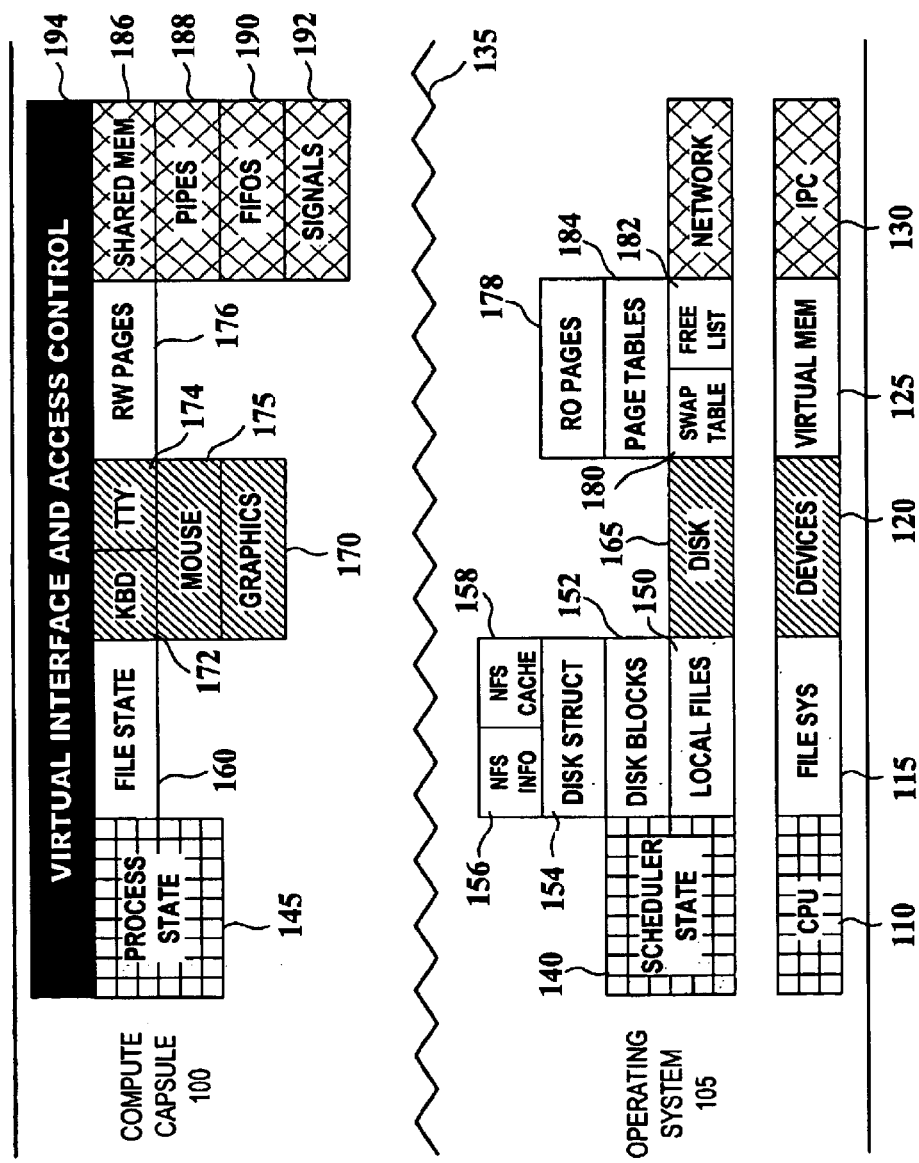
FIG. 1 is a block diagram showing the re-partitioning of functionality between the operating system and the compute capsule.

To provide such functionality, the traditional operating system is re-partitioned as shown in FIG. 1 so that all host-dependant and personalized elements of the computing environment are moved into the capsule 100, while leveraging policies and management of the shared underlying system 105. The computing environment comprises CPU 110, file system 115, devices 120, virtual memory 125, and IPC 130. Each of these components of the computing environment have been partitioned as indicated by the curved line 135.

The state of the CPU scheduler 140 is left in the operating system 105. This state comprises formation that the operating system maintains so that it knows which processes may run, where they are, what priority they have, how much time they will be granted processor attention, etc. Process state 145, which is moved to the compute capsule 100, has process-specific information, such as the values in the registers, the signal handlers registered, parent/child relationships, access rights, and file tables. The file system 115 leaves local files 150 that are identically available on all machines, (e.g., /usr/bin or /man on a UNIX system) in the operating system 105. The file system 115 further leaves disk blocks 152 outside the capsule, which are caches of disk blocks that are read into the system and can be later used when needed to be read again. The disk structure 154 is also left outside the capsule. The disk structure is specific to an operating system and serves as a cache of where files are located on the disk, (i.e., a mapping of pathnames to file locations). Network file system (NFS) is a protocol for accessing files on remote systems. The operating system maintains information 156 with respect to the NFS and a cache 158, which is a cache of files the operating system has retrieved from remote servers and stored locally. Similar state is maintained for other network based file systems.

What has been partitioned away from the operating system is the file state 160. The file state 160 is moved to the capsule 100. The file state 160 is the state of a file that some process in the capsule has opened. File state 160 includes, for instance, the name of the file and where the process currently accessing the file. If the file is not accessible via the network (e.g., stored on a local disk), then its contents are placed in the capsule.

Devices 120 are components that are attached to the computer. For each device there is a driver that maintains the state of the device. The disk state 165 remains in the operating system 105. The other device components are specific to a log-in session and are moved to the capsule 100. The other devices include a graphics controller state 170, which is the content that is being displayed on the screen, for instance the contents of a frame buffer that holds color values for each pixel on a display device, such as a monitor.

Keyboard state 172 and mouse state 175 includes the state associated with the user's current interaction with the keyboard, for instance whether caps lock is on or off and with the screen, for instance where the pointer is currently located. Tty state 174 includes information associated with the terminals the user is accessing, for instance if a user opens an Xwindow on a UNIX system or if a user telnets or performs an rlogin. Tty state 174 also includes information about what the cursor looks like, what types of fonts are displayed in the terminals, and what filters should be applied to make the text appear a certain way, for instance.

Virtual memory 125 has state associated with it. The capsule tracks the state associated with changes made from within the capsule which are termed read/write pages 176. Read-only pages 178 remain outside the capsule. However, in one embodiment read-only pages 178 are moved to the capsule as well, which is useful in some scenarios. For instance, certain commands one would expect to find on a new machine when their capsule migrates there may not be available. Take, for instance, a command such as ls or more on a UNIX system. Those read-only pages may not be necessary to bring into the capsule when it is migrating between UNIX machines, because those pages exist on every UNIX machine. If, however, a user is moving to a machine that does not use those commands, it is useful to move those read only pages into the capsule as well. The swap table 180, which records what virtual memory pages have been replaced and moved to disk, remains outside the capsule as do the free list 182, (which is a list of empty virtual memory pages), and the page table 184.

Nearly all IPC 130 is moved into the capsule. This includes shared memory 186, which comprises a portion of memory that multiple processes may be using, pipes 188, fifos 190, signals 192, including handler lists and the state needed to know what handler the process was using and to find the handler. Virtual interface and access control 194 is useful for separating the capsule from host-dependent information that is specific to a machine, such as the structure of internal program state or the IDs for its resources. The interface 194 refers generally to the virtualized naming of resources and translations between virtual resource names and physical resources, as well as lists that control access to processes trying to access capsules.

Thus, capsule state includes data that are host-specific, cached on the local machine to which the capsule is bound, or not otherwise globally accessible. This includes the following information:

Capsule State: Name translation tables, access control list, owner ID, capsule name, etc.;

Processes: Tree structure, process control block, machine context, thread contexts, scheduling parameters, etc.;

Address Space Contents: Read/write pages of virtual memory; because they are available in the file system, contents of read-only files mapped into the address space (e.g., the application binary and libraries) are not included unless explicitly requested;

Open File State: Only file names, permissions, offsets, etc. are required for objects available in the global file system. However, the contents of personal files in local storage (e.g., /tmp) must be included. Because the pathname of a file is discarded after it is opened, for each process one embodiment of the invention maintains a hash table that maps file descriptors to their corresponding pathnames. In addition, some open files have no pathname, (i.e., if an unlink operation has been performed). The contents of such files are included in the capsule as well;

IPC Channels: IPC state has been problematic in most prior systems. The present invention adds a new interface to the kernel modules for each form of IPC. This interface includes two complementary elements: export current state, and import state to re-create channel. For example, the pipe/fifo module is modified to export the list of processes attached to a pipe, its current mode, the list of filter modules it employs, file system mount points, and in-flight data. When given this state data, the system can re-establish an identical pipe;

Open Devices: By adding a state import/export interface similar to that used for IPC, the invention supports the most commonly used devices: keyboard, mouse, graphics controller, and pseudo-terminals. The mouse and keyboard have very little state, mostly the location of the cursor and the state of the LEDs (e.g., caps lock). The graphics controller is more complex. The video mode (e.g., resolution and refresh rate) and the contents of the frame buffer must be recorded, along with any color tables or other specialized hardware settings. Supporting migration between machines with different graphics controllers is troublesome, but a standard remote display interface can address that issue. Pseudo-terminal state includes the controlling process, control settings, a list of streams modules that have been pushed onto it, and any unprocessed data.

Capsules do not include shared resources or the state necessary to manage them (e.g., the processor scheduler, page tables), state for kernel optimizations (e.g., disk caches), local file system, physical resources (e.g., the network), etc.

Capsule Operation

Figure 2:
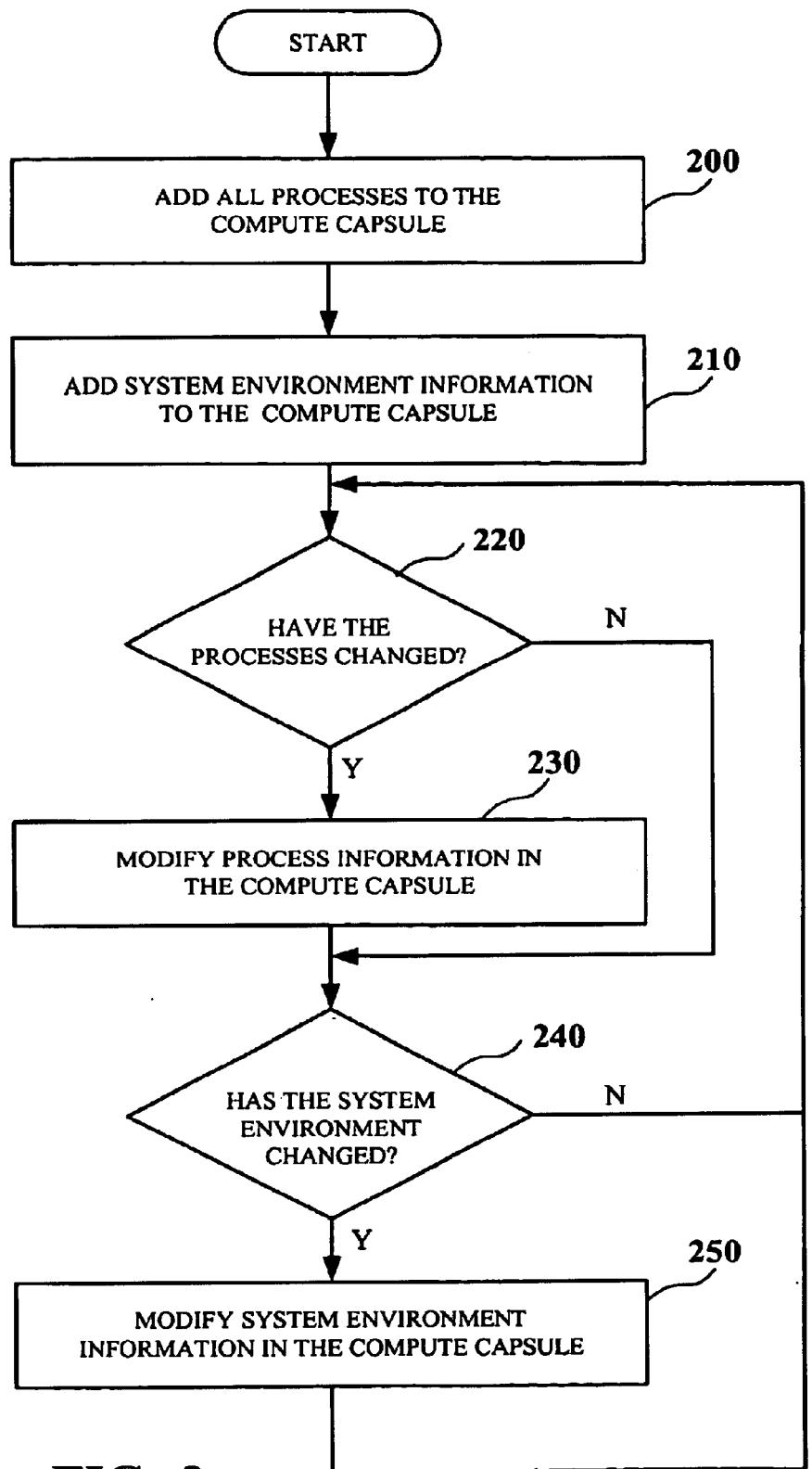
FIG. 2 is a flowchart describing how compute capsules are created and maintained according to an embodiment of the present invention.

Once the operating system is re-partitioned, one embodiment of the present invention creates and maintains a compute capsule as shown in the flowchart of FIG. 2. At step 200, all of a user's processes are added to the capsule. Next, at step 210 all of the user's system environment is added to the capsule. Thereafter, at step 220, it is determined whether a user has initiated new processes or if some of the user's processes have terminated. If so, the process information in the capsule is modified at step 230. Next, it is determined at step 240, whether the user's system environment has changed. If it has not, the process repeats at step 220. If it has, the system environment information in the capsule is updated at step 250 and the process repeats at step 220.

Figure 3A:
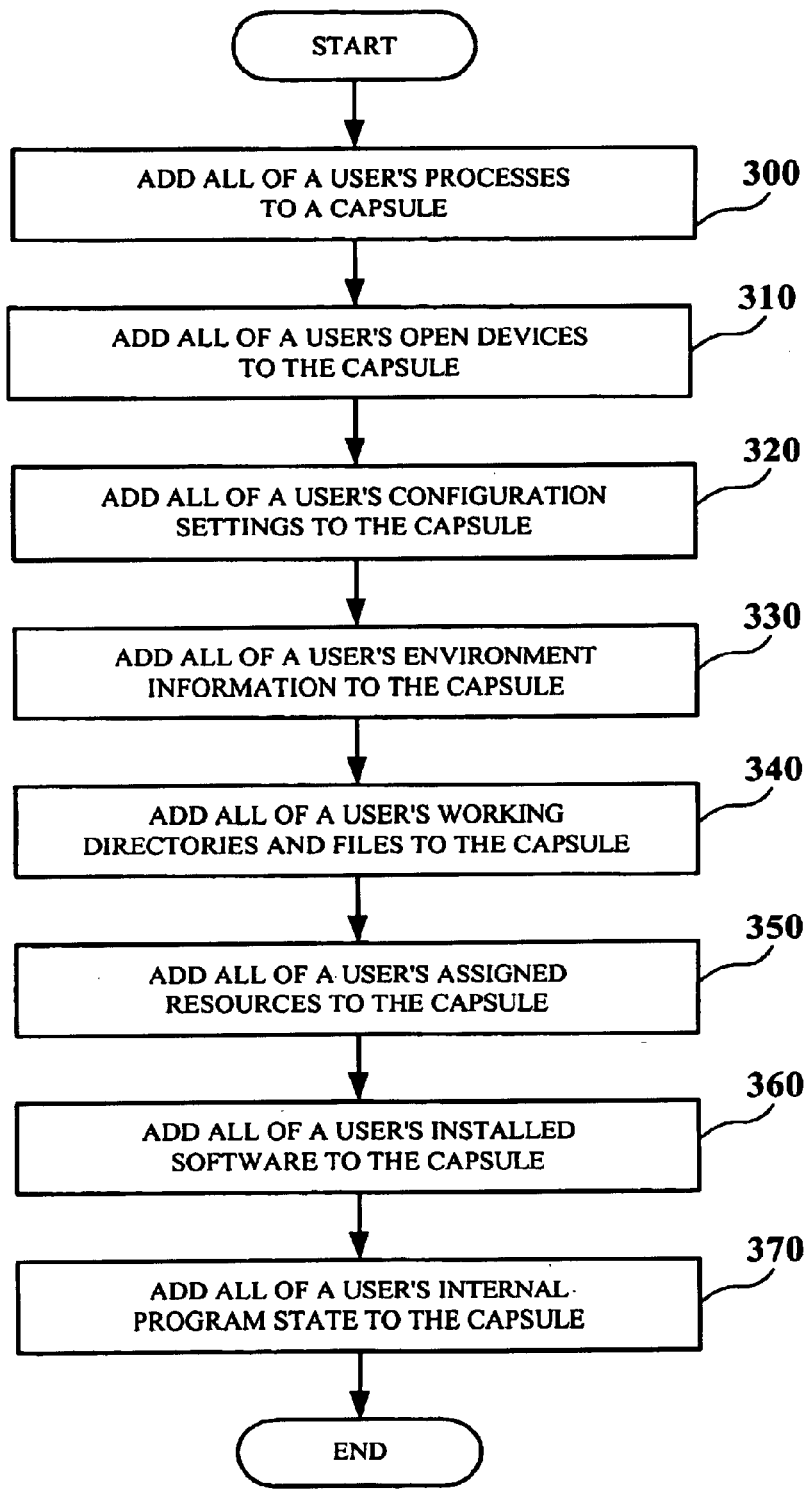
FIG. 3A illustrates the capsule creation process according to an embodiment of the present invention.

Another embodiment of the present invention is shown in FIG. 3A. At step 300, all of a user's processes are added to the capsule. Next, at step 310 all privileges are added to the capsule. Then, at step 320, all open devices are added to the capsule. After that all configuration settings are added to the capsule at step 330. Next, all working directories and files are added to the capsule at step 340. Then, all assigned resources are added to the capsule at step 350. Next, all installed software is added to the capsule at step 360. Finally, all internal program state is added to the capsule at step 370. Note that FIG. 3 is for the purpose of providing an example of what may be added to a capsule and is not an exhaustive list.

Figure 3B:
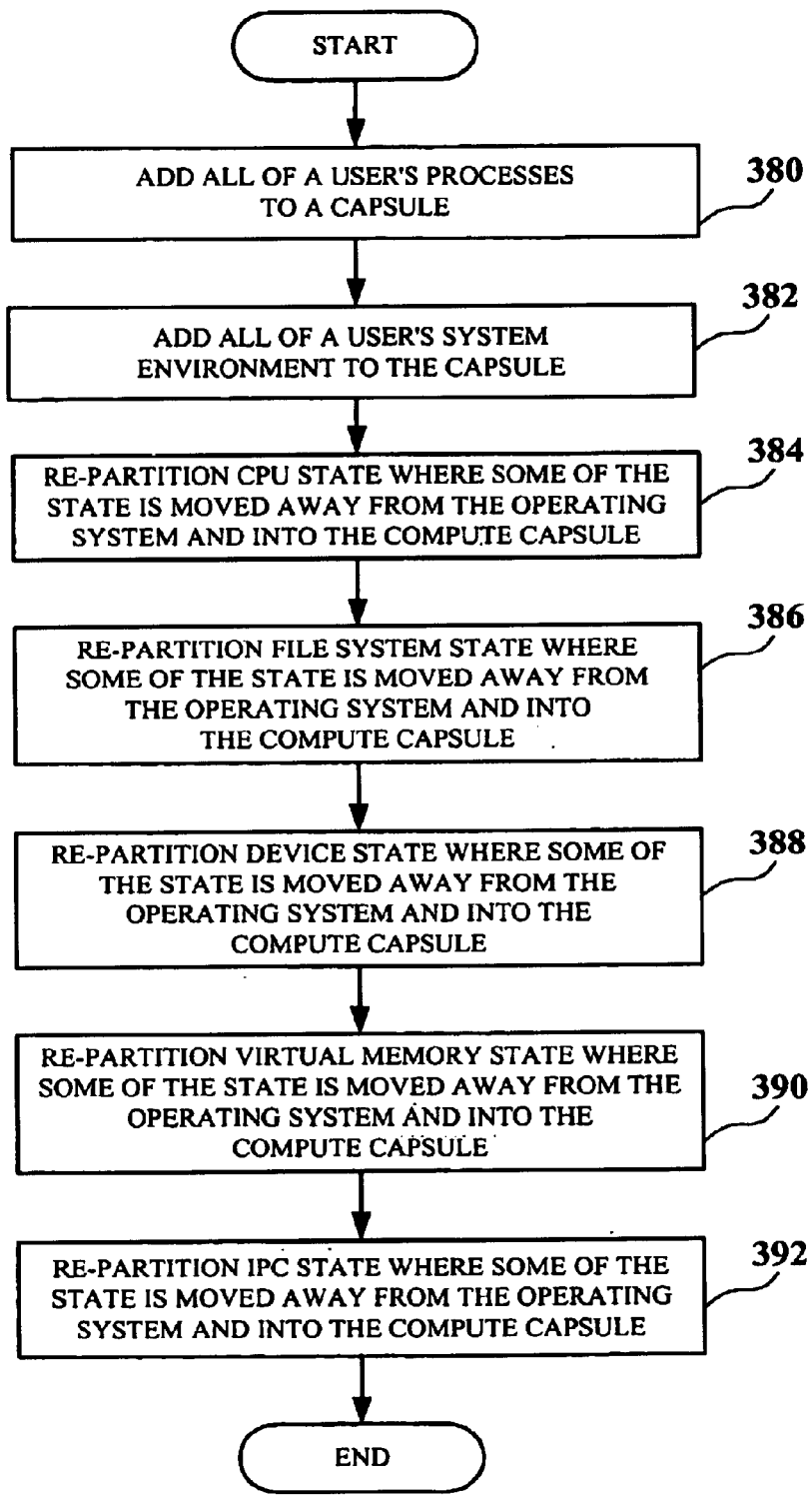
FIG. 3B illustrates the capsule creation process according to another embodiment of the present invention.

Another embodiment of the present invention is shown in FIG. 3B. At step 380, all of a user's processes are added to the capsule. Next, at step 382 all of the user's system environment is added to the capsule. Then, at step 384 CPU state is re-partitioned, where some of the state is moved away from the operating system and into the compute capsule, which may include process state. Next, at step 386, file system state is re-partitioned, where some of the state is moved away from the operating system and into the compute capsule, which may include file state. After that, at step 388 device state is re-partitioned where some of the state is moved away from the operating system and into the compute capsule, which may include keyboard state, tty (i.e., pseduo-terminal) state, mouse state, and graphics state. Then, at step 390, virtual memory state is re-partitioned, where some of the state is moved away from the operating system and into the compute capsule, which may include read/write pages and optionally read only pages. Thereafter, IPC state is re-partitioned at step 392, where some of the state is moved away from the operating system and into the compute capsule, which may include shared memory, pipes, fifos, and signals.

In operation, one embodiment of the invention defines several new operating system interface routines. These new routines are defined in Table 1.

TABLE 1

| Name | Description |
| --- | --- |
| capsule_create | Create a new capsule and install a process. |
| capsule_join | Move a process into an existing capsule. |
| capsule_acl | Manage the access control list for a capsule. |
| capsule_checkpoint | Suspend a capsule and record its state. |
| capsule_restart | Restart a capsule from its recorded state. |

Creating a Capsule

In one embodiment, an application may instantiate a new capsule or join an existing capsule via two new system calls, capsule_create and capsule_join, respectively. Typically, a user performs these operations via standard login facilities, which are modified to capture entire user sessions as capsules. To ensure proper use, the capsule_create and capsule_join system calls in one embodiment are privileged operations that may only be invoked by the root user and are incorporated into the login facility and remote access utilities (i.e., login, telnet, rsh, rlogin, ftp, rcp, rexec), thereby allowing users to create and join capsules transparently. In addition, one embodiment allows a user to create a new capsule to execute a specified application. This is useful for creating capsules with arbitrary contents, not just ones which represent login sessions.

In one embodiment, the capsule_create request includes the name of the user who will own the capsule and the initial process to be executed (e.g., a login shell). Normally, the capsule has the same owner as the invoking process, which requires no special permission. Creating capsules for other users, however, requires privileged access. Once the system verifies access rights, it allocates a unique identifier and instantiates the capsule on any machine, perhaps based on load-balancing demands. Capsule membership is inherited by process descendents, (i.e., children of a member process will belong to the same capsule, regardless of user identity).

Figure 4:
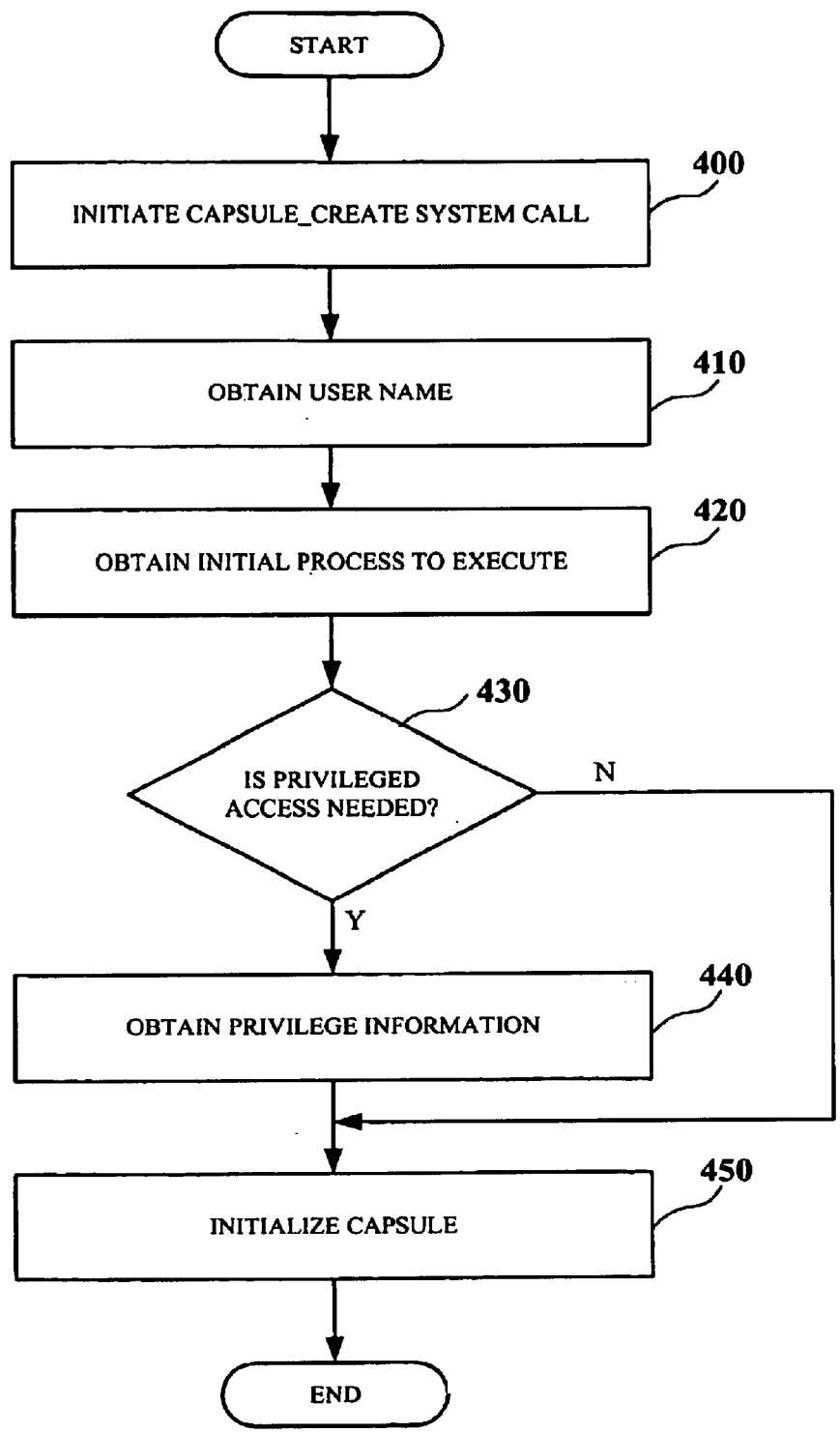
FIG. 4 is a flowchart showing an embodiment of the present invention that uses a capsule_create system call.

One embodiment of the capsule creation process is shown in FIG. 4. At step 400, the user initiates a capsule_create system call. Then at step 410 a user name is obtained. Next, an initial process to be executed is obtained at step 420. At step 430, it is determined if privileged access is needed. Owners of the capsule do not need privileged access; others may. If privileged access is needed, then privilege information is obtained at step 440 and the capsule is initialized at step 450.

Figure 5:
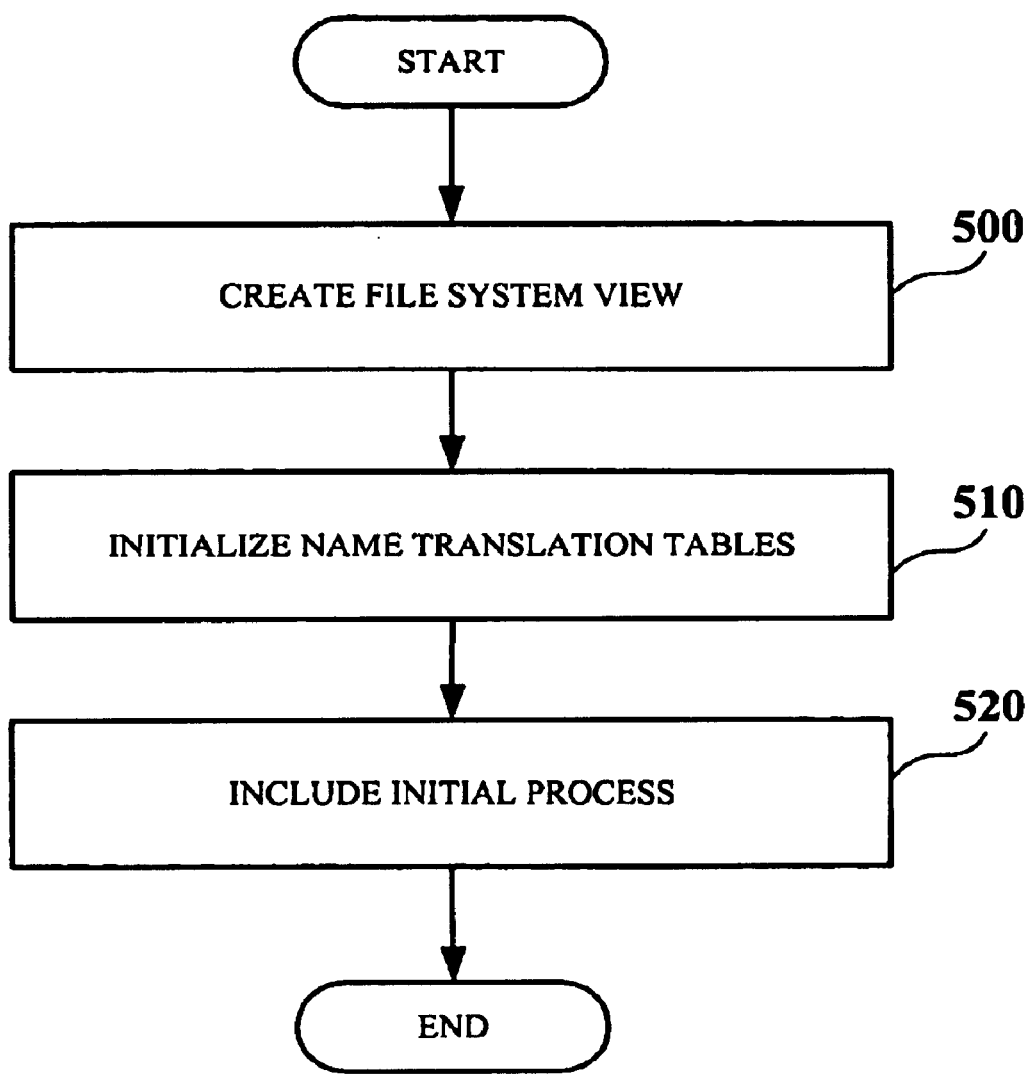
FIG. 5 is a flowchart showing capsule initialization according to an embodiment of the present invention.

Capsule initialization which may occur, for instance, at step 450 of FIG. 4 is shown in FIG. 5. As shown in FIG. 5, the initialization process includes creating a view of the file system that is unique to the capsule at step 500. The file system view allows the user to name files within their capsule in a customized way, as opposed to current implementations where the file system is bound to a machine and organized and named by others. The file system view may be based on user preferences and system defaults. Next, at step 510, all name translation tables required to virtualize the system interface are initialized. The name translation tables detach the capsule from location-dependent resource names that currently bind processes to specific machines. For instance, processes maybe assigned host-independent names that are valid on any machine in the system. Then, at step 520, the initial process is included.

Figure 6:
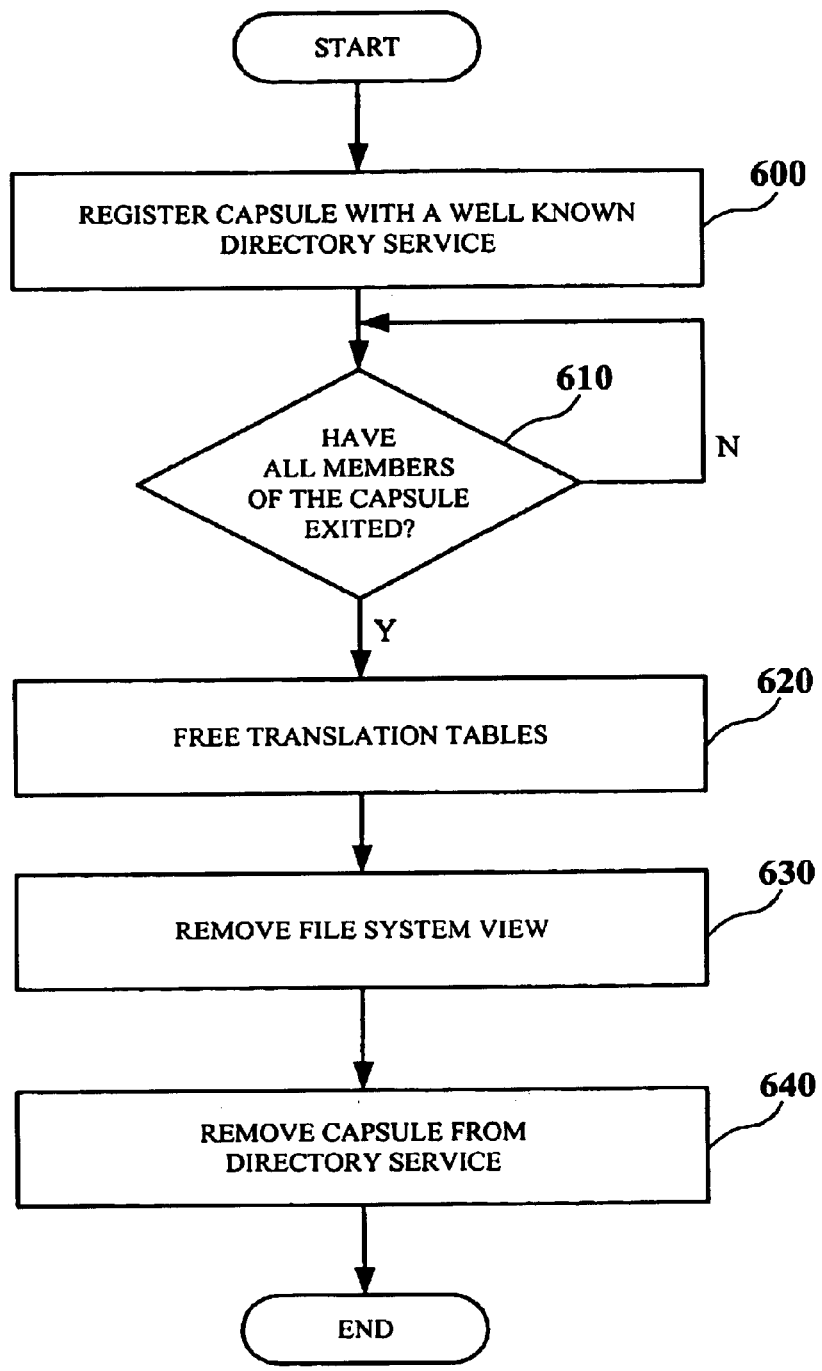
FIG. 6 is a flowchart showing how a capsule is maintained and removed from the system according to an embodiment of the present invention.

Once the capsule has been successfully created it is maintained in the system as shown in FIG. 6. First, the system registers its name and location with a well-known directory service, such as the lightweight directory access protocol at step 600. This enables users and applications to locate, manage and join other capsules. Next, it is determined whether all members of the compute capsule have exited at step 610. If they have not, the capsule remains active and continues to behave in a usual manner where processes execute, are initiated, or terminate based on the state of the system. If, however, all members of the compute capsule have exited, the system reaps the capsule itself as follows: the translation tables are freed at step 620; the file system view is removed at step 630; and the capsule name is removed from the directory service at step 640.

Figure 7:
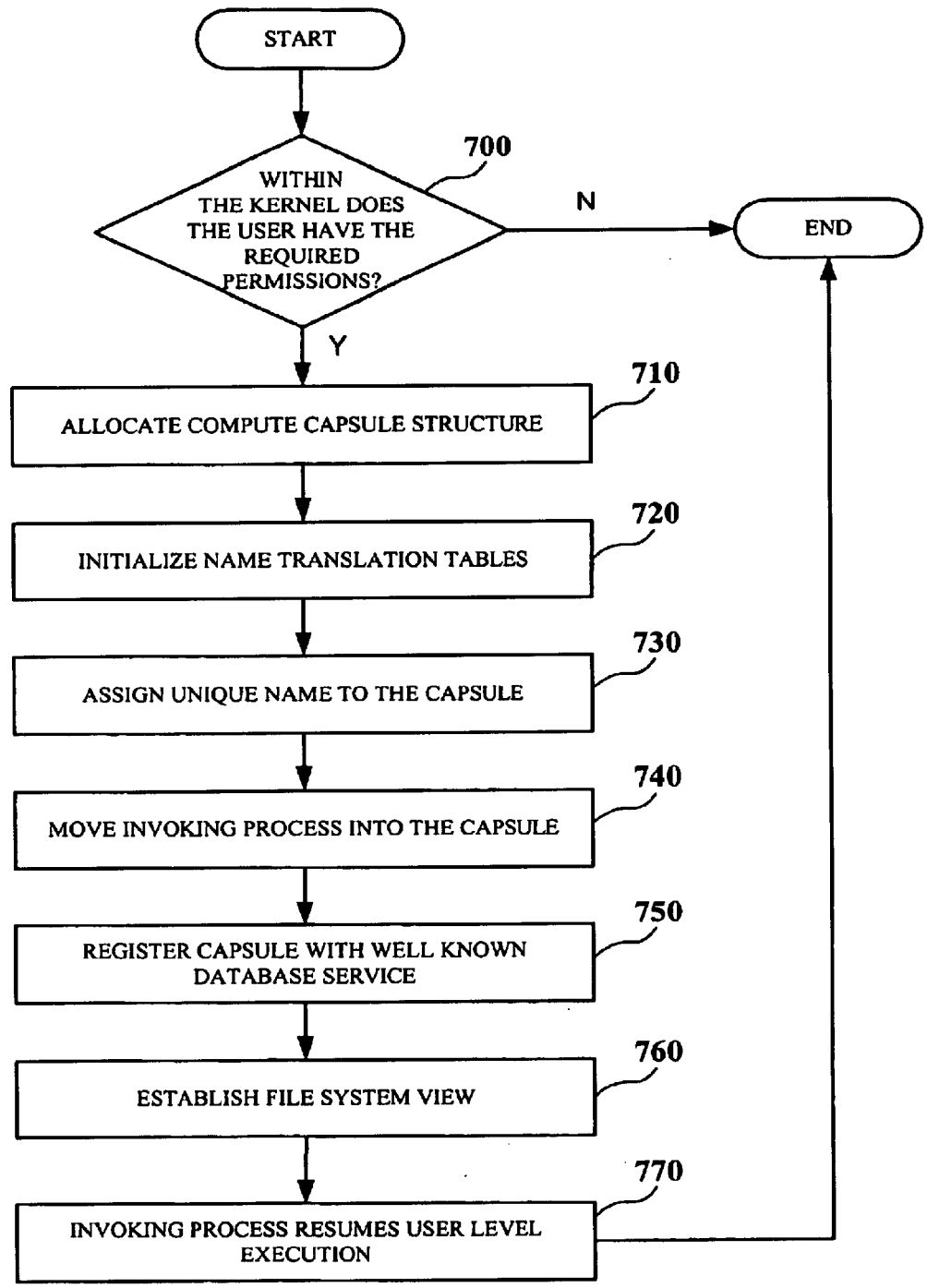
FIG. 7 is a flowchart showing how a capsule is created according to an embodiment of the present invention where some of the functionality remains in the kernel.

In one embodiment, capsule creation is implemented partly in the kernel and partly in user space within the standard system library. This embodiment of the present invention is shown in FIG. 7. First, within the kernel, the user's permissions are checked at step 700. If the user does not have the required permissions, no capsule is created and the algorithm terminates. Otherwise, a compute capsule structure is allocated at step 710, the name translation tables are initialized at step 720, a unique name is assigned to the capsule at step 730, and the invoking process is moved into the new capsule at step 740.

At this point, the parent process resides in a different capsule, which creates a non-conforming means of inter-capsule communication (e.g., through signal or wait system calls). Thus, in this embodiment top-level capsule members are restricted to be children of the Unix init process, which is responsible for waiting on orphaned processes to exit. Because init exists on every Unix system, it does not add a host dependency. Next, control returns to the library interface code, which registers the capsule name in a well-known database service that is mapped into each capsule at step 750. Finally, the file system view is established at step 760, and the invoking process resumes user-level execution as the sole member of the new capsule at step 770.

Joining a Capsule

The only way to enter another capsule is for a process to execute a capsule_join operation. The requestor queries the capsule directory service for the name of the target capsule and requests the system to create a new process in the specified capsule. The requestor's access rights are checked, and then the desired application is instantiated within the target capsule.

Figure 8:
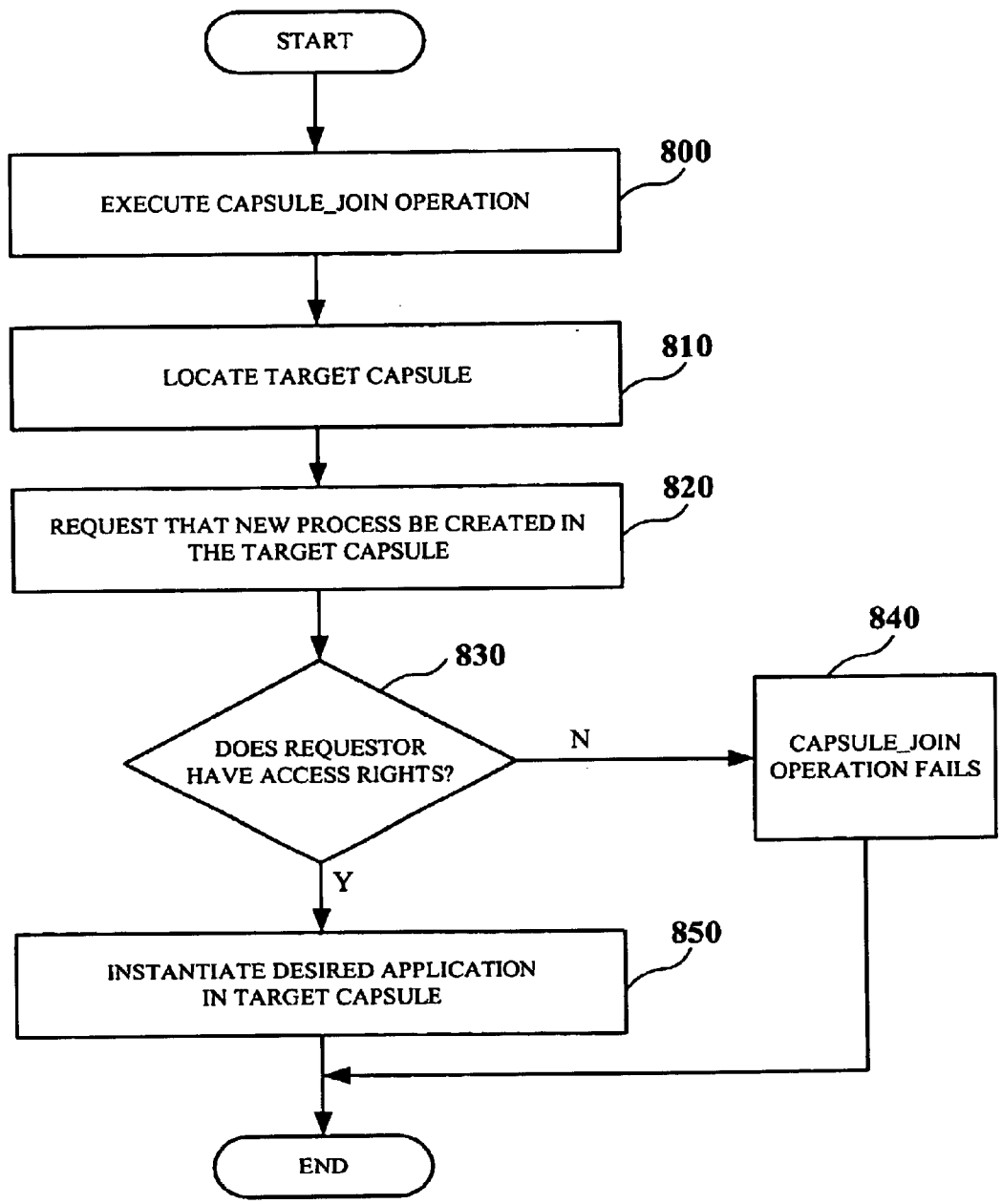
FIG. 8 illustrates the capsule join process according to an embodiment of the present invention.

The capsule joining process is described in connection with FIG. 8. At step 800, a capsule join operation is executed. Then, at step 810, the requestor locates the target capsule. Next, at step 820, the requestor requests that a new process be created within the target capsule. At step 830, it is determined whether the requester has access rights. If the requestor does not have access rights, the capsule join operation fails at step 840. Otherwise, the desired application is instantiated within the target capsule at step 850.

Figure 9:
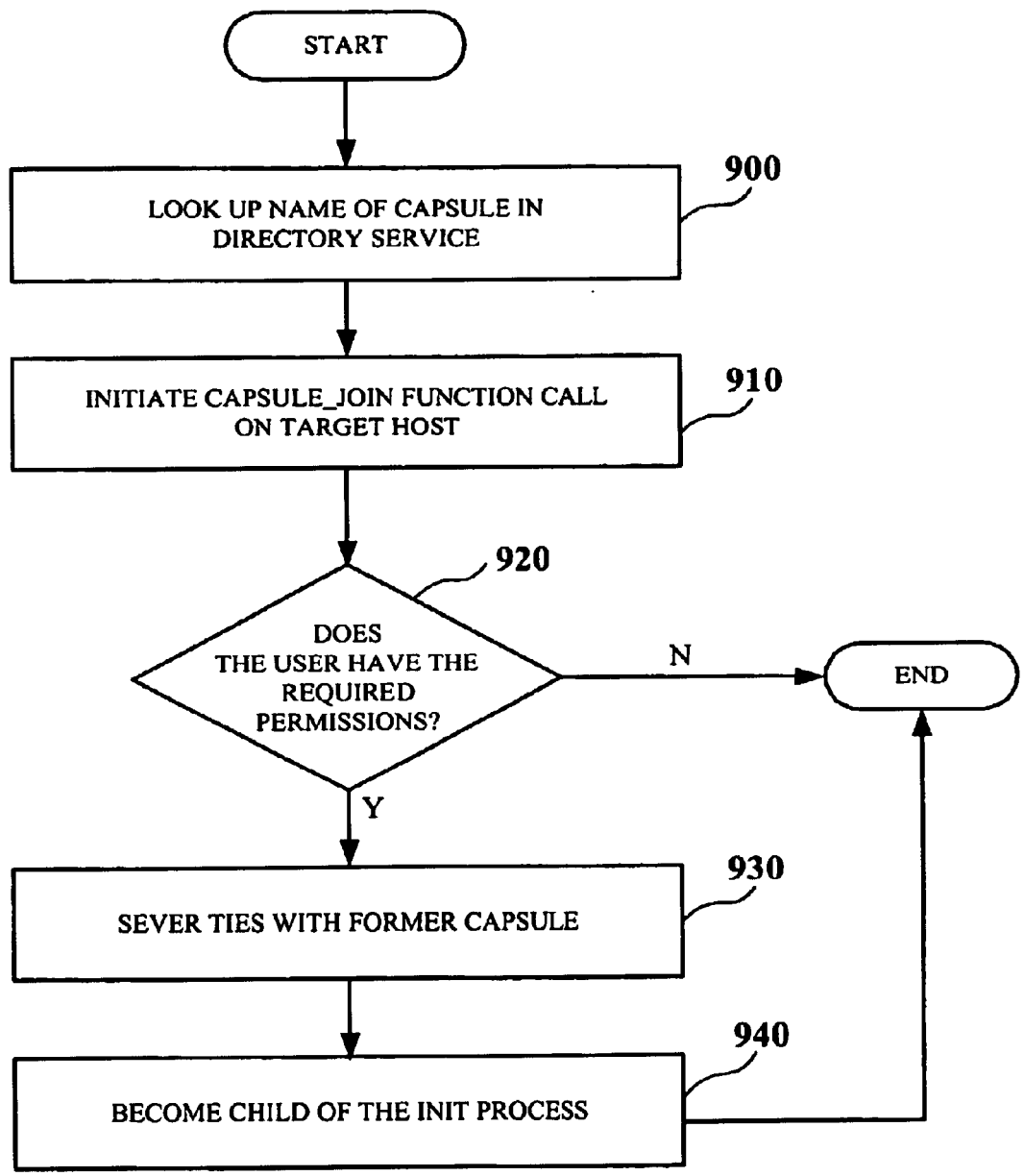
FIG. 9 illustrates the capsule join process according to another embodiment of the present invention.

Another embodiment of the present invention where a capsule is joined is shown in FIG. 9. In FIG. 9 to join a capsule, the user looks up its logical name in the capsule directory at step 900 to obtain its current location. Then, the user issues a capsule_join system call on the target host at step 910. The system checks the user's permission at step 920 to determine if the user has the required permissions to join the capsule. If the user does not have the required permissions, the algorithm terminates. Otherwise, the invoking process is moved into the destination capsule by severing its ties to its former capsule at step 930 and becoming a child of the init process at step 940.

As mentioned above, capsule membership is inherited by the descendents of a process. To accomplish this goal, process creation system calls, (i.e., fork vfork, etc.) have been modified in this embodiment. Once the child process is created, the kernel adds it to the same capsule as its parent. Similarly, the kernel routine which reaps a defunct process has been modified so that it also removes the exiting process from its capsule. When the capsule contains no processes, it is removed from the system: kernel resources are released, the file system view is unmapped, and the capsule name directory is updated.

Owner Control of Internal Capsule Environment

Maintaining the internal environment of a capsule is the responsibility of its member processes. This includes managing the file system view, process control, and customization, for instance. Because any member may perform such operations (when permitted by the underlying system), access to the capsule must be carefully controlled. Thus, each capsule has a private list of users who are granted access; called an access control list (ACL). This ACL can only be modified by a capsule's owner.

In one embodiment, a capsule_join system call first checks that the requestor is on the ACL before moving a process into the target capsule. Users not on the list, including administrative users, cannot add processes to the capsule. Thus, although a UNIX setuid program may assign root-level access rights, it will not enable a process to illicitly access other capsules. The capsule ACL is initially empty, (i.e., only the owner mayjoin). A new system call (capsule_acl) is implemented in one embodiment of the present invention for modifying the ACL, and only the capsule owner is authorized to invoke it. Users may be added and deleted, and the entire ACL may be disabled altogether. In addition, one embodiment of the present invention uses a utility program to simplify ACL manipulation.

Figure 15:
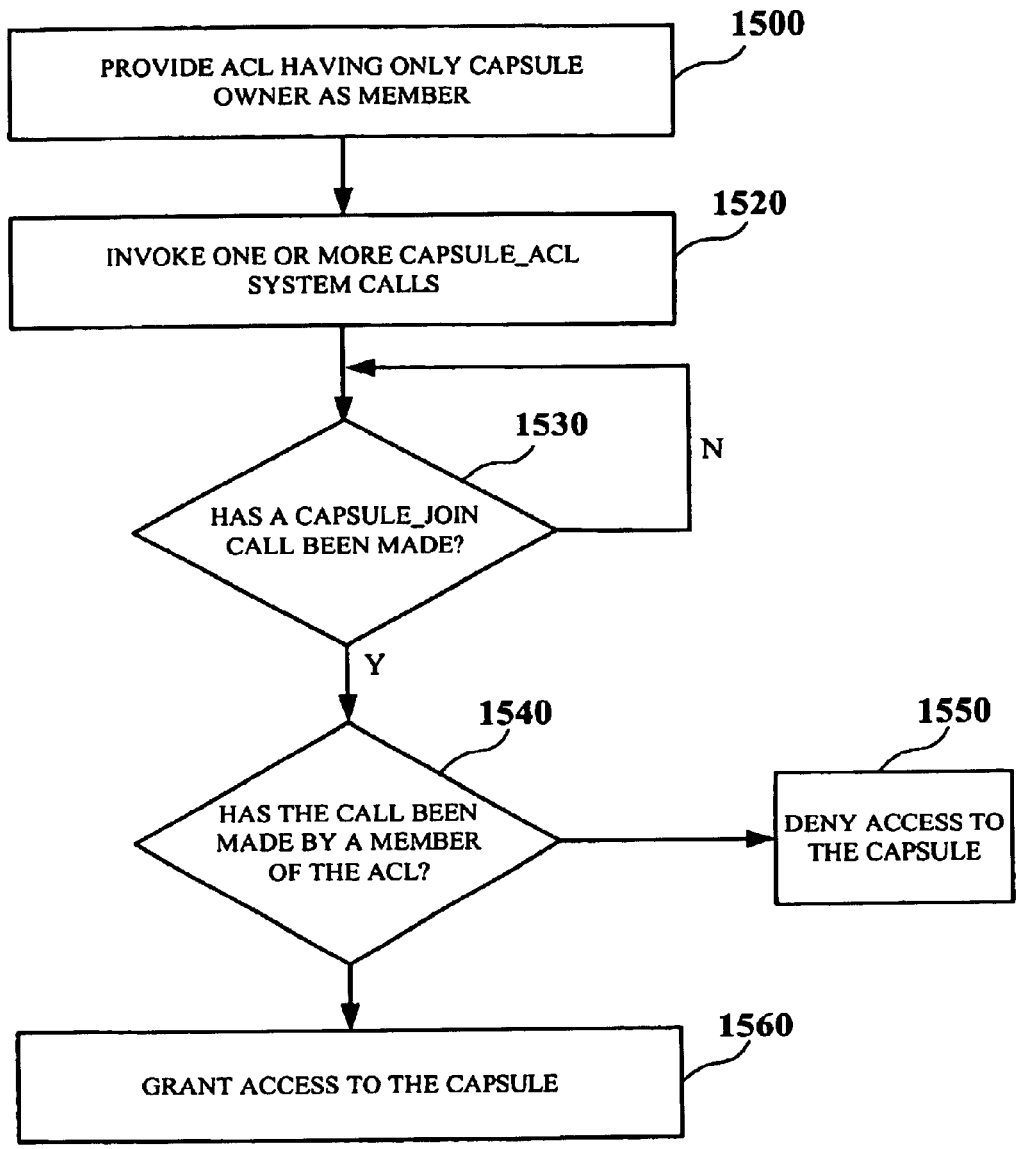
FIG. 15 is a flowchart showing the manner in which one embodiment of the present invention controls access to compute capsules.

FIG. 15 is a flowchart showing an embodiment of access control. Initially at step 1500 an ACL is provided having only the owner of the capsule as a member. Thereafter, one or more capsule_acl system calls are invoked by the capsule owner at step 1520, thereby adding members to the ACL. Next, it is determined whether a capsule_join call has been made 1530. If not, the system waits until such a call is made. If the call is made the system checks to see if the call is made by a member on the ACL 1540. If the call is made by an entity not on the ACL, access to the capsule by the requesting process is denied at step 1550. Otherwise, access to the capsule is granted 1560.

Consider, for instance, a shared project workspace, such as a development environment or a cooperative group communication system. The project coordinator may create a capsule and grant access rights to the group members. A private project file space may be created, and it will only be accessible to group members. Persons working on the project simply join the group capsule and begin to immediately share resources with the other members.

Access to the Underlying Operating System

In one implementation, the underlying operating system is accessed by logging into a machine as the user root. This has the same effect as logging into a traditional machine as root, (e.g., all processes and machine-local resource names are visible). Because capsule membership is inherited, switching user identities or running a setuid program within a capsule will not have the same effect. To provide an interface identical to the traditional operating environment, one embodiment must avoid normal capsule-related operations, such as name translation. Thus, wherever a capsule operation occurs, the invention verifies that the active process is within a standard capsule before proceeding. For example, when running a command to list the processes in the system no PID translation is performed and the machine local PIDs for all processes are displayed.

Implementation

In one embodiment, compute capsules are implemented as a set of extensions to the Solaris Operating Environment developed by Sun Microsystems, Inc. In this embodiment, a thin layer of software is interposed between the application and kernel. This includes a set of modifications to the kernel code, new functions in the system libraries, and a set of new utility programs. Other embodiments are implemented in different environments. One should note that the present invention can be implemented in any operating system environment.

Embodiment of Computer Execution Environment (Hardware)

Figure 10:
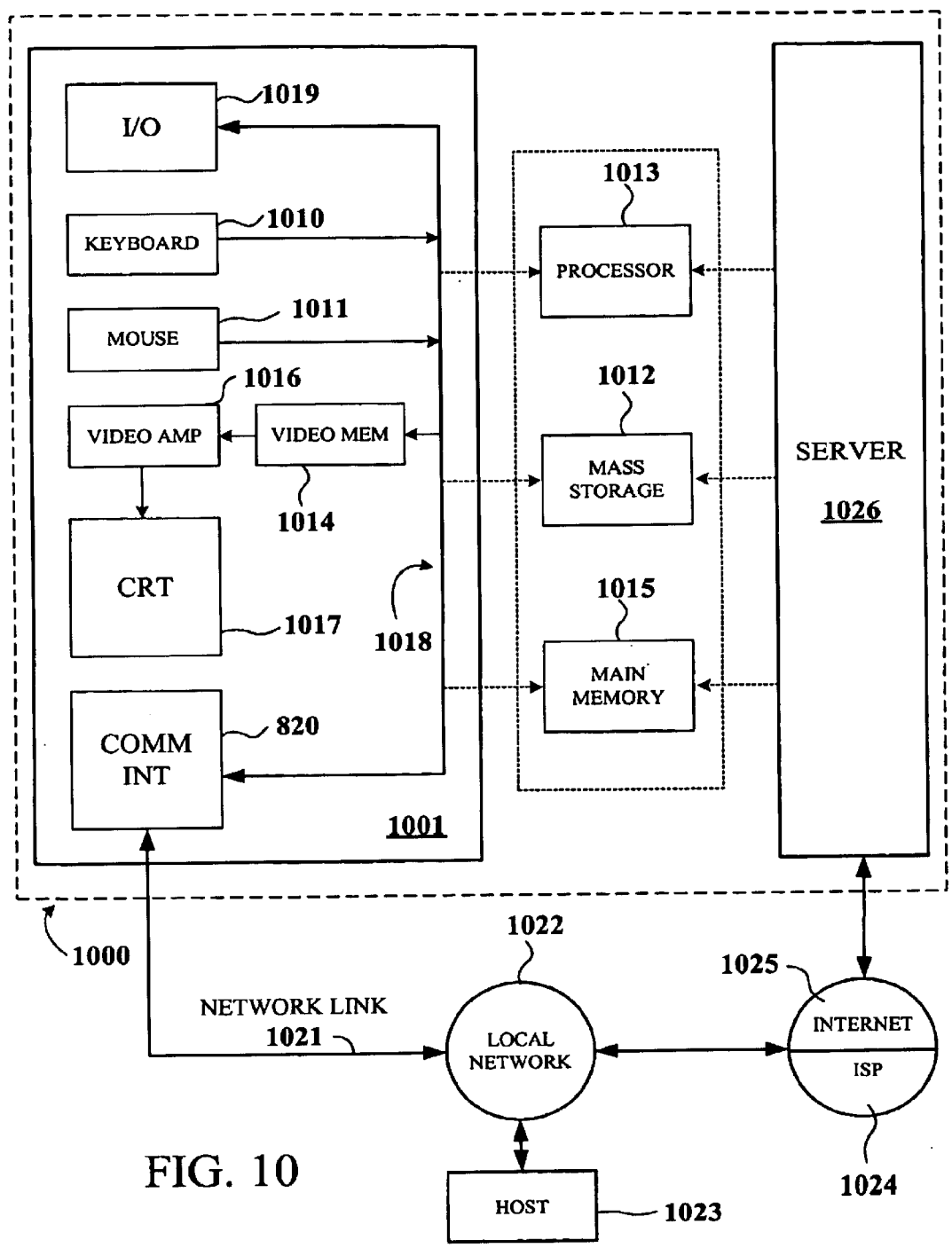
FIG. 10 is an embodiment of a computer execution environment in which one or more embodiments of the present invention can be implemented.

An embodiment of the invention can be implemented as computer software in the form of computer readable program code executed in a general purpose computing environment such as environment 1000 illustrated in FIG. 10, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 1010 and mouse 1011 are coupled to a system bus 1018. The keyboard and mouse are for introducing user input to the computer system and communicating that user input to central processing unit (CPU) 1013. Other suitable input devices may be used in addition to, or in place of, the mouse 1011 and keyboard 1010. I/O (input/output) unit 1019 coupled to bi-directional system bus 1018 represents such I/O elements as a printer, A/V audio/video) I/O, etc.

Computer 1001 may include a communication interface 1020 coupled to bus 1018. Communication interface 1020 provides a two-way data communication coupling via a network link 1021 to a local network 1022. For example, if communication interface 1020 is an integrated services digital network (ISDN) card or a modem, communication interface 1020 provides a data communication connection to the corresponding type of telephone line, which comprises part of network link 1021. If communication interface 1020 is a local area network (LAN) card, communication interface 1020 provides a data communication connection via network link 1021 to a compatible LAN. Wireless links are also possible. In any such implementation, communication interface 1020 sends and receives electrical, electromagnetic or optical signals which carry digital data streams representing various types of information.

Network link 1021 typically provides data communication through one or more networks to other data devices. For example, network link 1021 may provide a connection through local network 1022 to local server computer 1023 or to data equipment operated by ISP 1024. ISP 1024 in turn provides data communication services through the world wide packet data communication network now commonly referred to as the "Internet" 1025. Local network 1022 and Internet 1025 both use electrical, electromagnetic or optical signals which carry digital data streams. The signals through the various networks and the signals on network link 1021 and through communication interface 1020, which carry the digital data to and from computer 1000, are exemplary forms of carrier waves transporting the information.

Processor 1013 may reside wholly on client computer 1001 or wholly on server 1026 or processor 1013 may have its computational power distributed between computer 1001 and server 1026. Server 1026 symbolically is represented in FIG. 10 as one unit, but server 1026 can also be distributed between multiple "tiers". In one embodiment, server 1026 comprises a middle and back tier where application logic executes in the middle tier and persistent data is obtained in the back tier. In the case where processor 1013 resides wholly on server 1026, the results of the computations performed by processor 1013 are transmitted to computer 1001 via Internet 1025, Internet Service Provider (ISP) 1024, local network 1022 and communication interface 1020. In this way, computer 1001 is able to display the results of the computation to a user in the form of output.

Computer 1001 includes a video memory 1014, main memory 1015 and mass storage 1012, all coupled to bi-directional system bus 1018 along with keyboard 1010, mouse 1011 and processor 1013. As with processor 1013, in various computing environments, main memory 1015 and mass storage 1012, can reside wholly on server 1026 or computer 1001, or they may be distributed between the two. Examples of systems where processor 1013, main memory 1015, and mass storage 1012 are distributed between computer 1001 and server 1026 include the thin-client computing architecture developed by Sun Microsystems, Inc., the palm pilot computing device and other personal digital assistants, Internet ready cellular phones and other Internet computing devices, and in platform independent computing environments, such as those which utilize the Java technologies also developed by Sun Microsystems, Inc.

The mass storage 1012 may include both fixed and removable media, such as magnetic, optical or magnetic optical storage systems or any other available mass storage technology. Bus 1018 may contain, for example, thirty-two address lines for addressing video memory 1014 or main memory 1015. The system bus 1018 also includes, for example, a 32-bit data bus for transferring data between and among the components, such as processor 1013, main memory 1015, video memory 1014 and mass storage 1012. Alternatively, multiplex data/address lines may be used instead of separate data and address lines.

In one embodiment of the invention, the processor 1013 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 1015 is comprised of dynamic random access memory (DRAM). Video memory 1014 is a dual-ported video random access memory. One port of the video memory 1014 is coupled to video amplifier 1016. The video amplifier 1016 is used to drive the cathode ray tube (CRT) raster monitor 1017. Video amplifier 1016 is well known in the art and may be implemented by any suitable apparatus. This circuitry converts pixel data stored in video memory 1014 to a raster signal suitable for use by monitor 1017. Monitor 1017 is a type of monitor suitable for displaying graphic images.

Computer 1001 can send messages and receive data, including program code, through the network(s), network link 1021, and communication interface 1020. In the Internet example, remote server computer 1026 might transmit a requested code for an application program through Internet 1025, ISP 1024, local network 1022 and communication interface 1020. The received code may be executed by processor 1013 as it is received, and/or stored in mass storage 1012, or other non-volatile storage for later execution. In this manner, computer 1000 may obtain application code in the form of a carrier wave. Alternatively, remote server computer 1026 may execute applications using processor 1013, and utilize mass storage 1012, and/or video memory 1015. The results of the execution at server 1026 are then transmitted through Internet 1025, ISP 1024, local network 1022 and communication interface 1020. In this example, computer 1001 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programing or processing environment.

Virtual Desktop System Architecture

Figure 11:
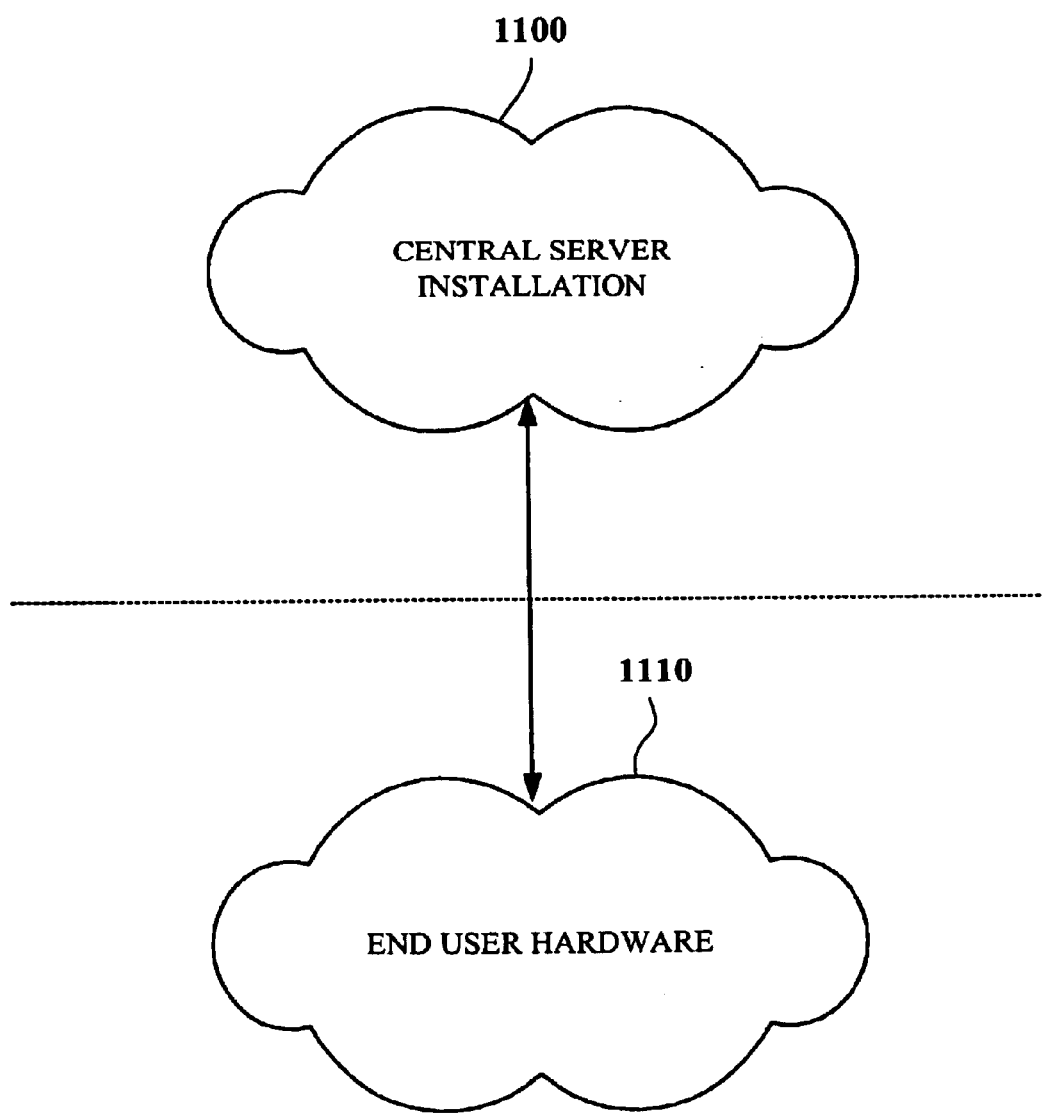
FIG. 11 shows an example of a thin client topology called a virtual desktop system architecture.

FIG. 11 shows an example of a thin client topology called a virtual desktop system architecture. The virtual desktop system architecture is one setting in which capsules are useful, but capsules are not limited to this setting. Capsules are also useful on standalone workstations, such as one that is described in connection with FIG. 11, and in a variety of other computing environments as well.

The virtual desktop system architecture provides a re-partitioning of functionality between a central server installation 1100 and end user hardware 1110. Data and computational functionality are provided by data sources via a centralized processing arrangement. At the user end, all functionality is eliminated except that which generates output to the user (e.g., display and speakers), takes input from the user (e.g., mouse and keyboard) or other peripherals that the user may interact with (e.g., scanners, cameras, removable storage, etc.). All computing is done by the central data source and the computing is done independently of the destination of the data being generated. The output of the source is provided to a terminal, referred to here as a "Human Interface Device" (HID). The HID is capable of receiving the data and displaying the data.

Figure 12:
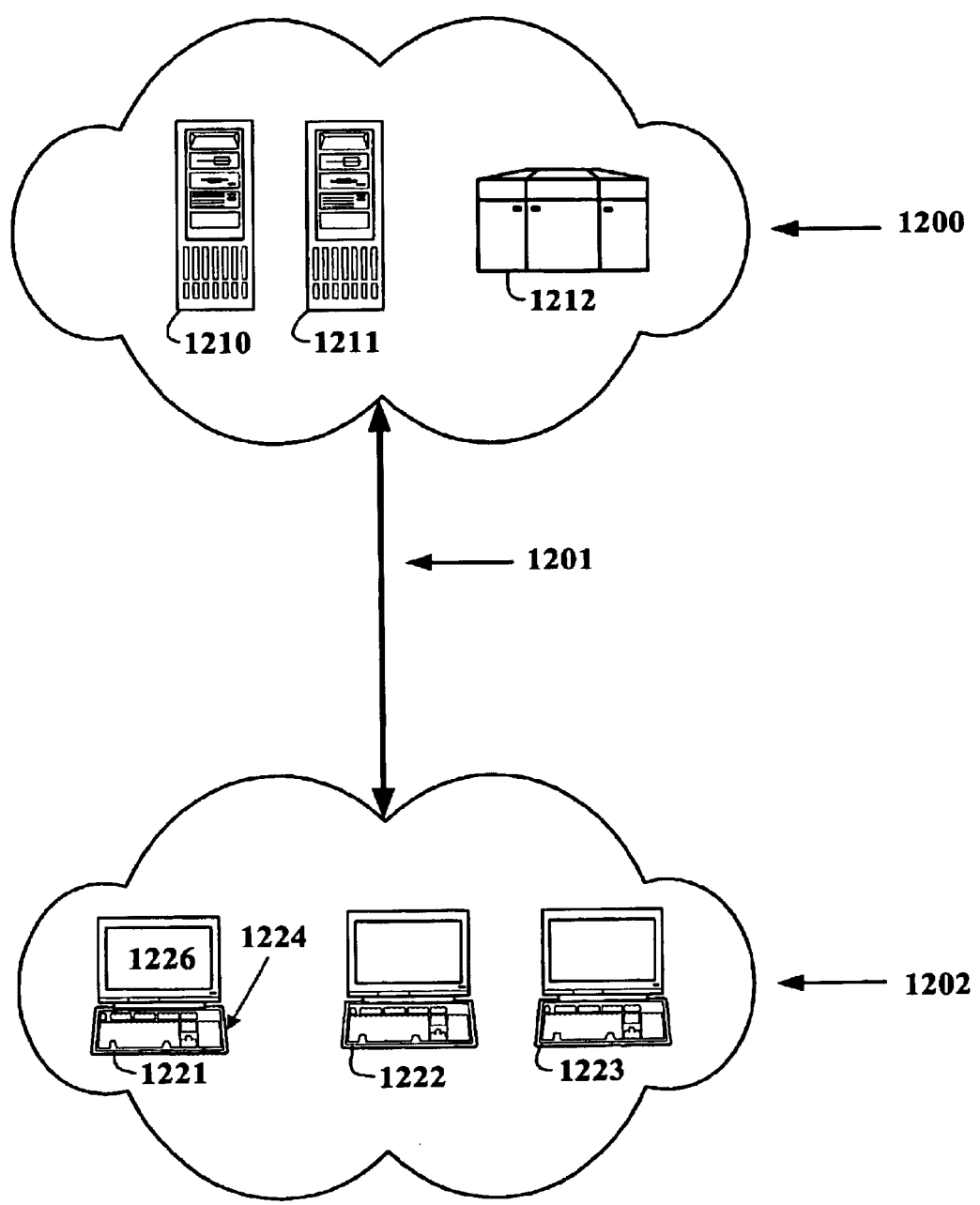
FIG. 12 displays the partitioning of the functionality of the virtual desktop system architecture.

The functionality of the virtual desktop system is partitioned between a display and input device such as a remote system and associated display device, and data sources or services such as a host system interconnected to the remote system via a communication link The display and input device is a human interface device (HID). The system is partitioned such that state and computation functions have been removed from the HID and reside on data sources or services. One or more services communicate with one or more HIDs through a communication link such as network. An example of such a system is illustrated in FIG. 12, wherein the system comprises computational service providers 1200 communicating data through communication link 1201 to HIDs 1202.

The computational power and state maintenance is provided by the service providers or services. The services are not tied to a specific computer, but may be distributed over one or more traditional desktop systems such as described in connection with FIG. 9, or with traditional servers. One computer may have one or more services, or a service maybe implemented by one or more computers. The service provides computation, state and data to HIDs and the service is under the control of a common authority or manager. In FIG. 12, the services are provided by computers 1210, 1211, and 1212. In addition to the services, a central data source can provide data to the HIDs from an external source such as for example the Internet or world wide web. The data source can also broadcast entities such as those that broadcast data such as television and radio signals.

Examples of services include X11/Unix services, archived or live audio or video services, Windows NT service, Java program execution service and others. A service herein is a process that provides output data and response to user requests and input. The service handles communication with an HID currently used by a user to access the service. This includes taking the output from the computational service and converting it to a standard protocol for the HID. The data protocol conversion is handled by a middleware layer, such as the X11 server, the Microsoft Windows interface, video format transcoder, the OpenGL interface, or a variant of the java.awt.graphics class within the service producer machine. The service machine handles the translation to and from a virtual desktop architecture wire protocol described further below.

Each service is provided by a computing device optimized for its performance. For example, an Enterprise class machine could be used to provide X11/Unix service, a Sun MediaCenter could be used to provider video service, a Hydra based NT machine could provide applet program execution services.

The service providing computer system can connect directly to the HIDs through the interconnect fabric. It is also possible for the service producer to be a proxy for another device providing the computational service, such as a database computer in a three-tier architecture, where the proxy computer might only generate queries and execute user interface code.

The interconnect fabric can comprise any of multiple suitable communication paths for carrying data between the services and the HIDs. In one embodiment the interconnect fabric is a local area network implemented as an Ethernet network. Any other local network may also be utilized. The invention also contemplates the use of wide area networks, the Internet, the world wide web, and others. The interconnect fabric may be implemented with a physical medium such as a wire or fiber optic cable, or it may be implemented in a wireless environment.

The interconnect fabric provides actively managed, low-latency, high-bandwidth communication between the HID and the services being accessed. One embodiment contemplates a single-level, switched network, with cooperative (as opposed to competing) network traffic. Dedicated or shared communications interconnects maybe used in the present invention.

The HID is the means by which users access the computational services provided by the services. FIG. 12 illustrates HIDs 1221, 1222 and 1223. Each HID comprises a display 1226, a keyboard 1224, mouse (not shown), and audio speakers (not shown). The HID includes the electronics need to interface these devices to the interconnection fabric and to transmit to and receive data from the services.

Figure 13:
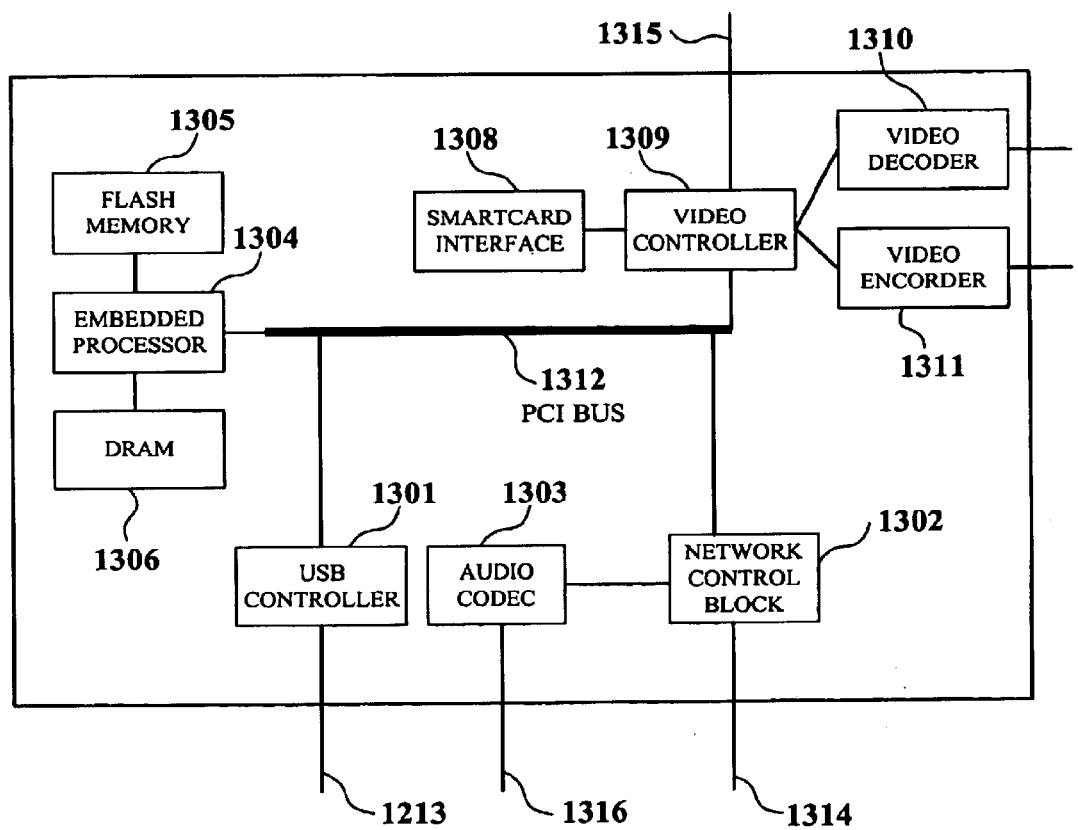
FIG. 13 is a block diagram of an example embodiment of a human interface device.

A block diagram of an example embodiment of the HID is illustrated in FIG. 13. The components of the HID are coupled internally to a PCI bus 1312. A network control block 1302 communicates to the interconnect fabric, such as an Ethernet, through line 1314. An audio codec 1303 receives audio data on interface 1316 and is coupled to block 1302. USB data communication is provided on lines 1313 to a USB controller 1301. The HID further comprises a embedded processor 1304 such as a Sparc2ep with coupled flash memory 1305 and DRAM 1306. The USB controller 1301, the network controller 1302 and the embedded processor 1304 are all coupled to the PCI bus 1312. A video controller 1309, also coupled to the PCI bus 1312, can include an ATI RagePro+ frame buffer controller which provides SVGA output on the line 1315. NTSC data is provided in and out of the video controller through video decoder 1310 and encoder 1311 respectively. A smartcard interface 1308 may also be coupled to the video controller 1309.

Figure 14:
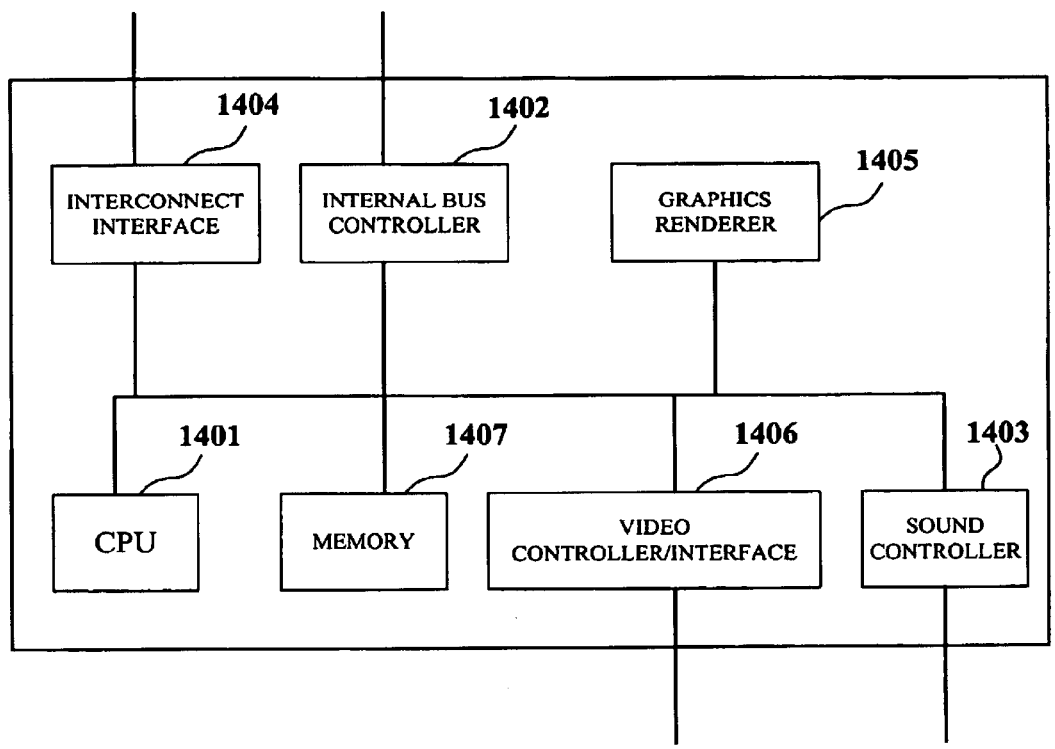
FIG. 14 is a block diagram of a single chip implementation of a human interface device.

Alternatively, the HID can comprise a single chip implementation as illustrated in FIG. 14. The single chip includes the necessary processing capability implemented via CPU 1401 and graphics renderer 1405. Chip memory 1407 is provided, along with video controller/interface 1406. A internal bus (USB) controller 1402 is provided to permit communication to a mouse, keyboard and other local devices attached to the HID. A sound controller 1403 and interconnect interface 1404 are also provided. The video interface shares memory 1407 with the CPU 1401 and graphics renderer 1405. The software used in this embodiment may reside locally in non-volatile memory or it can be loaded through the interconnection interface when the device is powered.

The operation of the virtual desktop system architecture is described in co-pending U.S. patent application Ser. No. 09/063,335, filed Apr. 20, 1998, entitled "Method and Apparatus for Providing A Virtual Desktop System Architecture" and assigned to the present assignee, and incorporated herein by reference.

Thus, a representation and encapsulation of an active computing environment is described in conjunction with one or more specific embodiments. The invention is defined by the claims and their full scope of equivalents.

What is claimed is:

1. A method for managing an active computing environment comprising:

encapsulating a plurality of active processes into a compute capsule; and encapsulating system environment information relating to said processes into said compute capsule, said system environment information including host-specific data;

the method further comprising adding all of a user's processes and system environment to said compute capsule;

repartitioning a file system state and moving some of said file system state into said compute capsule;

repartitioning a device state and moving some of said device state into said compute capsule;

repartitioning a virtual memory state and moving some of said virtual memory state into said compute capsule;

repartitioning inter-process communication (IPC) state and moving some of said IPC state into said compute capsule.

\* \* \* \* \*